US010836480B2

(12) United States Patent
Heinen et al.

(10) Patent No.: US 10,836,480 B2
(45) Date of Patent: Nov. 17, 2020

(54) FLIGHT VEHICLE

(71) Applicant: Raytheon Company, Waltham, MA (US)

(72) Inventors: Gregory W. Heinen, Lowell, MA (US); Charles Miller, Hopkinton, MA (US)

(73) Assignee: Raytheon Company, Waltham, MA (US)

( * ) Notice: Subject to any disclaimer, the term of this patent is extended or adjusted under 35 U.S.C. 154(b) by 364 days.

(21) Appl. No.: 15/794,169

(22) Filed: Oct. 26, 2017

(65) Prior Publication Data
US 2019/0127060 A1 May 2, 2019

(51) Int. Cl.
B64C 27/28 (2006.01)
B64C 39/02 (2006.01)
B64D 27/24 (2006.01)
B64C 29/00 (2006.01)

(52) U.S. Cl.
CPC .......... B64C 29/0033 (2013.01); B64C 27/28 (2013.01); B64C 39/024 (2013.01); B64D 27/24 (2013.01); B64C 2201/021 (2013.01); B64C 2201/024 (2013.01); B64C 2201/042 (2013.01); B64C 2201/104 (2013.01); B64C 2201/108 (2013.01)

(58) Field of Classification Search
CPC . B64C 27/28; B64C 29/0008; B64C 29/0016; B64C 29/0033; B64C 11/18; B64D 27/24
USPC ....................................................... 244/7 R
See application file for complete search history.

(56) References Cited

U.S. PATENT DOCUMENTS

| 3,035,789 A | 5/1962 | Young | |
|---|---|---|---|
| 6,671,590 B1* | 12/2003 | Betzina | B64C 27/001 415/119 |
| 8,864,062 B2* | 10/2014 | Karem | B64C 29/0033 244/12.4 |
| 9,550,567 B1* | 1/2017 | Erdozain, Jr. | B64C 29/02 |
| 2002/0035957 A1* | 3/2002 | Fischer, III | B63B 39/005 114/230.1 |
| 2007/0205321 A1* | 9/2007 | Waide | B64D 35/04 244/17.23 |

(Continued)

FOREIGN PATENT DOCUMENTS

| FR | 2 977 865 A3 | 1/2013 |
|---|---|---|
| WO | WO 01/76941 A2 | 10/2001 |

OTHER PUBLICATIONS

"Bombardier E-11A BACN"; Globalsecurity.org; Retrieved Jan. 16, 2018 from http://www.globalsecurity.org/military/systems/aircraft/e-11.htm; 4 Pages.

(Continued)

Primary Examiner — Christopher P Ellis
(74) Attorney, Agent, or Firm — Daly Crowley Mofford & Durkee, LLP

(57) ABSTRACT

Method and apparatus for a flight vehicle including a wing having a high aspect ratio and first and second rotors having a high aspect ratio, with a ratio of the rotor diameter to wing length ratio is equal to or greater than about 0.25. In embodiments, the flight vehicle can include a first and second motor, each less than about one thousand HP, to drive a respective rotor and a second motor. The flight vehicle can include a cruise mode and a VTOL mode.

20 Claims, 15 Drawing Sheets

(56) References Cited

U.S. PATENT DOCUMENTS

| | | | |
|---|---|---|---|
| 2011/0001020 A1 | 1/2011 | Forgac | |
| 2015/0300183 A1* | 10/2015 | Dumlupinar | F01D 5/021 415/1 |
| 2016/0001874 A1 | 1/2016 | Pitt et al. | |
| 2016/0244147 A1* | 8/2016 | Arata | B64C 9/24 |
| 2016/0311553 A1 | 10/2016 | Alber et al. | |

OTHER PUBLICATIONS

"Russia's Blast from the Past: Beware the Tu-95 Bear Strategic Bomber"; The National Interest; Retrieved Jan. 16, 2018 from http://nationalinterest.org/blog/the-buzz/russias-blast-the-past-beware-the-tu-95-bear-strategic-13669; 3 Pages.
Bell Helicopter; "Bell V-280 Valor, The Future of Vertical Lift"; www.bellhelicopter.com; 2 Pages.
Dowling; "Russia's Bear: The old-fashioned plane still thriving"; BBC; Feb. 26, 2015; 7 Pages.
Dutta; "How do the Propellers on a Tupolev TU-95 Work?"; Quora; Retrieved Jan. 16, 2018 from https://www.quora.com/How-do-the-propellers-on-a-Tupolev-TU-95-work; 4 Pages.
G520 Egrett Reference; Raytheon; May 8, 2017; 1 Page.
Giangreco; "Bell unveils V-247 Vigilant unmanned tiltrotor"; Flight Global; Washington, DC; Sep. 22, 2016; 5 Pages.
Hepperle; "Aerodyanmic Characteristics of Propellers"; MH-Aerotools; Retrieved Jan. 16, 2018 from http://www.mh-aerotools.de/airfoils/propuls3.html; 2 Pages.
Hepperle; "Static Thrust of Propellers"; MH-Aerotools; Retrieved Jan. 16, 2018 from http://www.mh-aerotools.de/airfoils/prpstati.html; 3 Pages.
History, War & Politics; Strange Planes: The Chance Vought V-173 "Flying Pancake" & The XF5U "Flying Flapjack"; Dec. 17, 2013; 3 Pages.
Jennings; "USAF has 'urgent' need to increase size of BACN fleet"; Jane's 360; Feb. 9, 2017; 3 Pages.
Lamar; Battlefield Airborne Communications Node (BACN); Northup Grumann; Retrieved Jan. 16, 2018 from http://www.northropgrumman.com/Capabilities/BACN/Pages/default.aspx;1 Page.
Lewis; "Theoretical Max Propeller Efficiency"; Jefflewis.net; Retrieved Jan. 16, 2018 from http://www.jefflewis.net/avation_theory-theo_prop_eff.html; 4 Pages.
McCaney; "Air Force awards $145.4M to keep BACN flying"; Defensesystems.com; Jun. 16, 2015; 5 Pages.
V-22 Osprey Reference; Raytheon; May 8, 2017; 1 Page.
Wright; "Restoration: Vought V-173, Why there will never be another Flying Pancake"; Air & Space Magazine; Nov. 2013; 2 Pages.
Chance Vought X-5 Large Variable Pitch Prop Reference; Raytheon; May 8, 2017; 1 Page.
PCT International Search Report and Written Opinion dated Dec. 3, 2018 for International Application No. PCT/US2018/051870; 15 Pages.
European Rule 161/162 Communication dated Jan. 31, 2020 for European Application No. 18789524.8; 3 Pages.
PCT International Preliminary Report dated May 7, 2020 for International Application No. PCT/US2018/051870; 9 Pages.
Response to European Rule 161/162 Communication dated Jan. 31, 2020 for European Application No. 18789524.8; Response filed Jul. 20, 2020; 41 Pages.

\* cited by examiner

FLIGHT VEHICLE

BACKGROUND

As is known in the art, there are a number of High Altitude Long Endurance (HALE) aircraft with various wingspans and rotor sizes operating at a wide range of airspeeds. Other types of known aircraft use a high bypass fan engine, such as an AE3007 engine, and operate at about Mach 0.75 and up to about 52 k ft. Conventional aircraft include Vought V-173, Strato 2C, Egrett G520 (Grob aircraft), Tupelov TU-95 and Osprey V-22 having various rotor and wing characteristics.

Previous attempts at large rotor winged aircraft have maximized lift capacity rather than endurance. The power of each of the Osprey engines is 4.7 MW with a carrying capacity of 47,000 lbs and the HALE vehicle Egrett G-520 (Honeywell TPE331-14F Turboprop aircraft engine) is about 560 kW (750 hp), and a carrying capacity of 2000 lbs. vs. the Osprey 47,000 weight capacity (factor of ~23). The Osprey has a rotor to wingspan ratio of 200%, 46 ft wingspan, 38 ft rotors and service ceiling at 25,000 ft, while the Egrett has a 10% ratio, with 108 ft wings, 10 ft rotors and 51,000 ft ceiling. The Tupolev long range bomber aircraft has a very large wing, with multiple very large 17 ft rotors. The short-winged V173 (23 ft wing) had 16 ft rotors and required a 22 degree nose-high angle on ground. A limit for a large fixed rotor is the pitch angle of the aircraft on takeoff.

SUMMARY

The present invention provides method and apparatus for a flight vehicle that attempts to maximize cruise endurance and efficiency using long glider-type wings and a high rotor diameter-to-wingspan ratio. In embodiments, a flight vehicle includes a vertical take-off and landing mode and a cruise mode. The rotors can transition between generally vertical and generally horizontal planes of rotation.

In embodiments, cruise endurance and efficiency is attempted to be optimized by maximizing rotor efficiency over a relatively wide range of airspeeds and providing a relatively high glide ratio (long wing). A relatively high static thrust parameter, for example in excess of 0.45, may be achieved for a winged aircraft having long wing sizes. In embodiments, a flight vehicle provides the ability to operate the aircraft over a large range of airspeeds at maximum rotor efficiency, as the rotor diameters are on the order of half the wingspan in example embodiments.

In one aspect of the invention, a flight vehicle comprises: a wing having a high aspect ratio; first and second rotors connected to the wing, wherein the first and second rotors have a high aspect ratio, wherein a ratio of the rotor diameter to wing length ratio is equal to or greater than about 0.25; a first motor to drive the first rotor and a second motor to drive the second rotor, the first and second motors having less than about one thousand horse power; wherein the flight vehicle has a cruise mode in which the first and second rotors are substantially vertical and a takeoff/landing mode in which the first and second rotors are substantially horizontal.

A flight vehicle can include one or more of the following features: the first rotor has a thrust coefficient of at least 0.55, the first rotor has a pitch angle of less than about twelve degrees, the first rotor has a static thrust coefficient of about 1.0, the first rotor has a thrust to power ratio of at least 15 LBF/HP, the first motor is less than 1000 HP, the vehicle has a rotor to wingspan ratio of at least about 0.9, the wing aspect ratio ranges from about 10:1 to about 30:1, the vehicle is configured for unmanned operation, the first motor comprises an electric motor, and/or the wing is connected to a fuselage by at least two V-struts.

In another aspect, a method for providing a flight vehicle comprises: connecting first and second rotors to a high aspect ratio wing, wherein the first and second rotors have a high aspect ratio, wherein a ratio of the rotor diameter to wing length ratio is equal to or greater than about 0.25; employing a first motor to drive the first rotor and a second motor to drive the second rotor, the first and second motors having less than about one thousand horse power; wherein the flight vehicle has a cruise mode in which the first and second rotors are substantially vertical and a takeoff/landing mode in which the first and second rotors are substantially horizontal.

A method can further include one or more of the following features: the first rotor has a thrust coefficient of at least 0.55, the first rotor has a pitch angle of less than about twelve degrees, the first rotor has a static thrust coefficient of about 1.0, the first rotor has a thrust to power ratio of at least 15 LBF/HP, the first motor is less than 1000 HP, the vehicle has a rotor to wingspan ratio of at least about 0.9, the wing aspect ratio ranges from about 10:1 to about 30:1, the vehicle is configured for unmanned operation, the first motor comprises an electric motor, and/or the wing is connected to a fuselage by at least two V-struts.

In a further aspect, a flight vehicle comprises: a wing means having a high aspect ratio; first and second rotor means connected to the wing means, wherein the first and second rotor means have a high aspect ratio, wherein a ratio of a rotor diameter to wing length ratio is equal to or greater than about 0.25; a first motor to drive the first rotor means and a second motor to drive the second rotor means, the first and second motors having less than about one thousand horse power; wherein the flight vehicle has a cruise mode in which the first and second rotors are substantially vertical and a takeoff/landing mode in which the first and second rotors are substantially horizontal.

BRIEF DESCRIPTION OF THE DRAWINGS

The foregoing features of this invention, as well as the invention itself, may be more fully understood from the following description of the drawings in which.

DETAILED DESCRIPTION

Figure 1A:
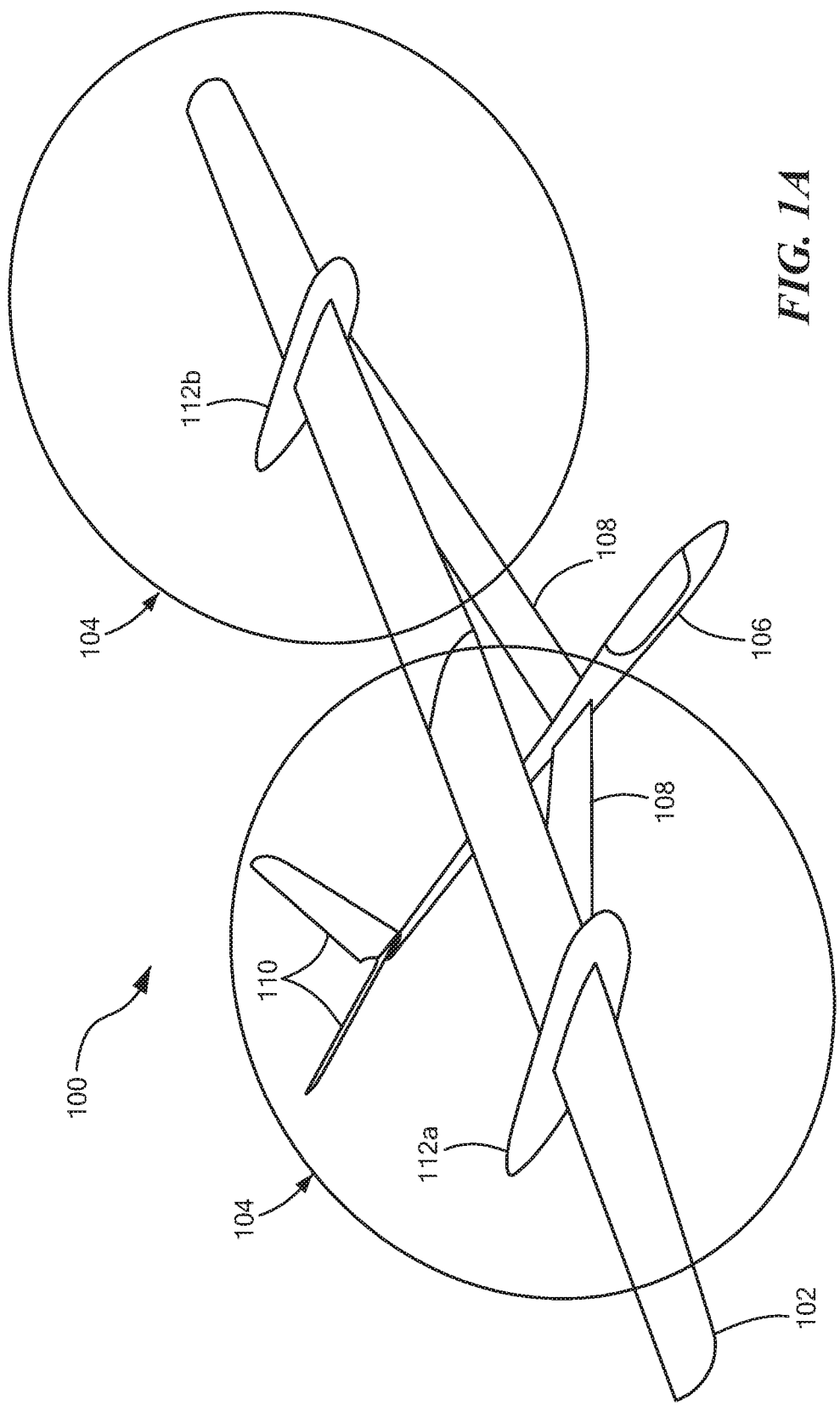
FIG. 1A is a schematic representation of an example flight vehicle in cruise mode.
Figure 1B:
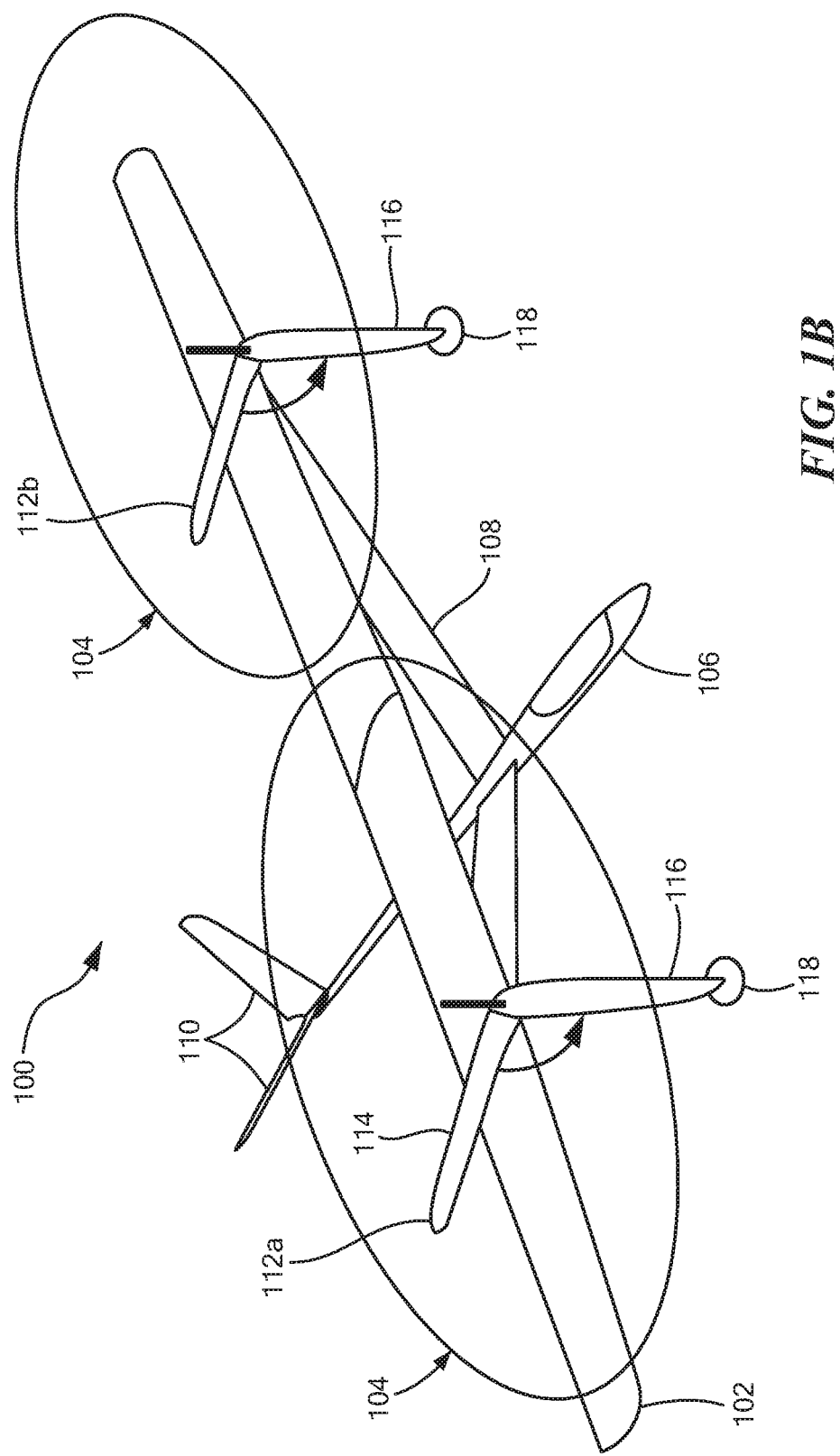
FIG. 1B is a schematic representation of an example flight vehicle in takeoff/landing mode.
Figure 2A:
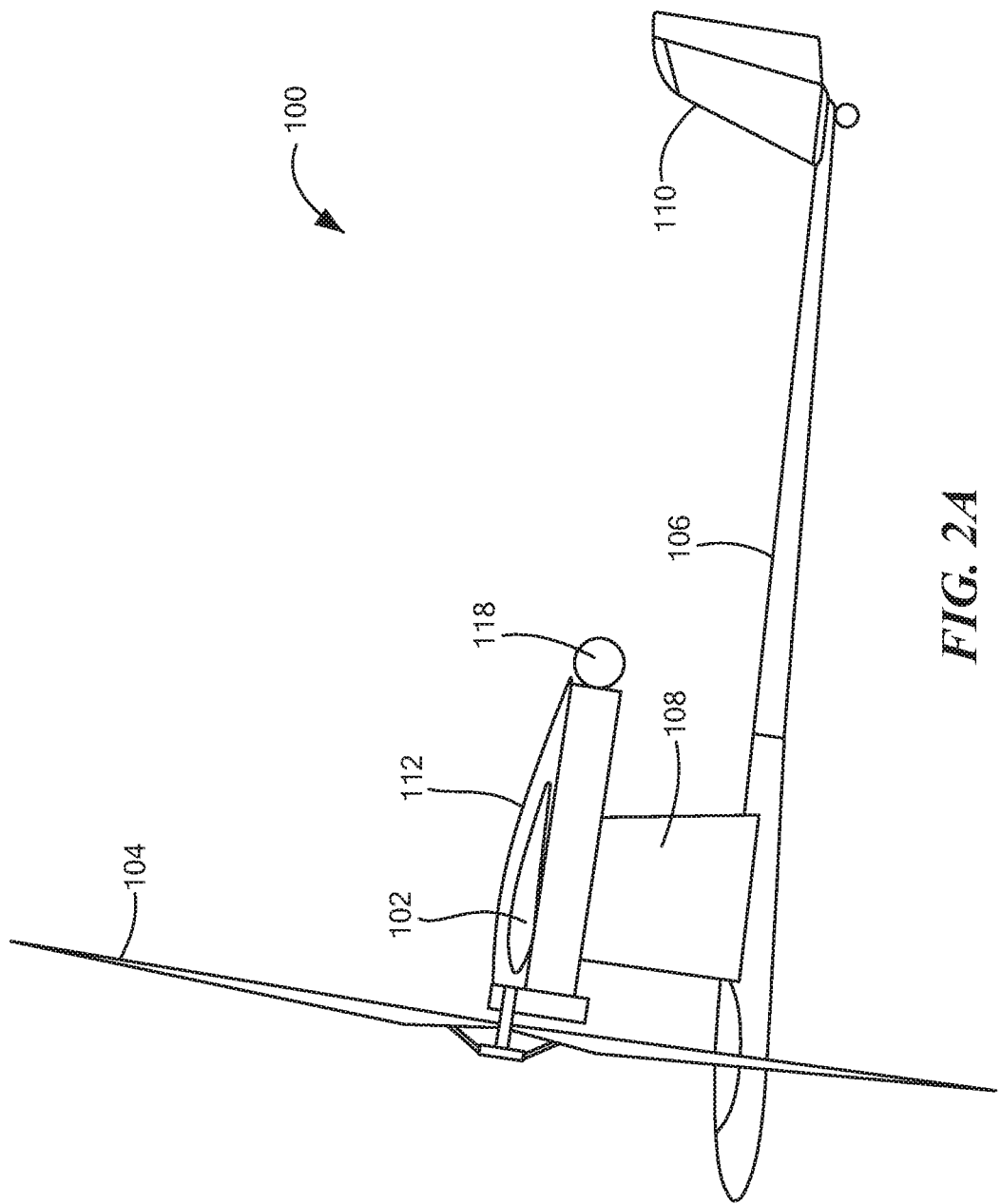
FIG. 2A is a side view of an example flight vehicle in cruise mode.
Figure 2B:
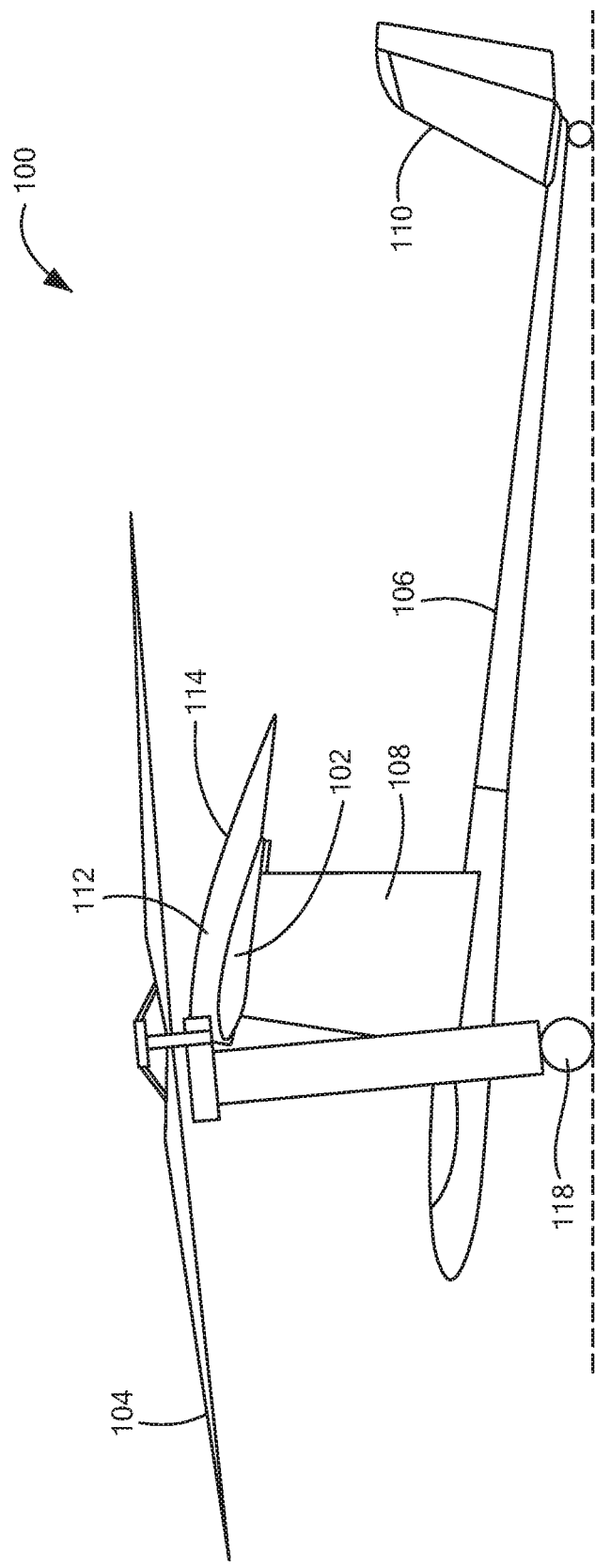
FIG. 2B is a side view of an example flight vehicle in takeoff/landing mode.

FIGS. 1A and 2A show an example flight vehicle 100 having at least one large wing 102 and large rotors 104 in cruise mode. FIGS. 1B and 2B shows the flight vehicle 100 in vertical takeoff and landing mode (VTOL). In embodiments, the rotors 104 are generally horizontal in the modes for vertical take off and landing (VTOL) or short field take off and landing (STOL) as shown in FIGS. 1B and 2B. In the cruise mode shown in FIGS. 1A and 2A, the rotors 104 are generally vertical to provide forward thrust in cruise mode.

The combination of a long rotor, which is preferred for propulsive efficiency, with a long wing, which is preferred for high lift and low drag, provides an inventive High Altitude Long Endurance (HALE) flight vehicle. In embodiments, the flight vehicle 100 provides efficient hover and cruise modes and high static thrust parameter and propulsive efficiency for desirable capability in high altitude long endurance missions.

In embodiments, the fuselage 106 of the flight vehicle 100 is below the wing 102 with first and second V-struts 108 connecting the wing 102 to the fuselage 106. A tail fin 110, which is shown as a split tail, can be located at a tail end of the fuselage 106. In one embodiment, first and second canards 112a,b (collectively identified as 112) are located at connection points of the struts 108 and the wing 102. The canards 112 can form part of an electric propulsion system and rotor positioning system. The fuselage 106 can include fuel, power, and control functionality.

In embodiments, V-struts 108 are used to decrease aeroelasticity and vibration modes. The V-struts 108 provide an elevated wing rigid structure which aligns with the rotors 104 to reduce aeroelastic modes. It is understood that any suitable structure to secure the wing 102 to the fuselage 106 can be used to meet the needs of a particular application. In embodiments, the strut 108 configuration results in minimum weight on the wing 102. The rotors 104 can be powered with an electric propulsion system in the canards 112 with a managed payload on, or secured to, the fuselage 106.

In embodiments, the first and second canards 112 can effect movement of the rotors 104. The canards 112 are 'closed' in cruise mode (FIGS. 1A, 2A) and 'open' in VTOL mode (FIGS. 1B, 2B). As shown in FIGS. 1B and 2B, a top part 114 of the canard 112 can be secured to the wing 102 and a bottom part 116 of the canard can rotate to about a ninety degree angle from the top part 114 to transition the rotor 104 to the VTOL mode. In embodiments, wheels 118 or other suitable mechanisms can be located at an end of the bottom part 116 for takeoff and landings of the flight vehicle 100.

Figure 1C:
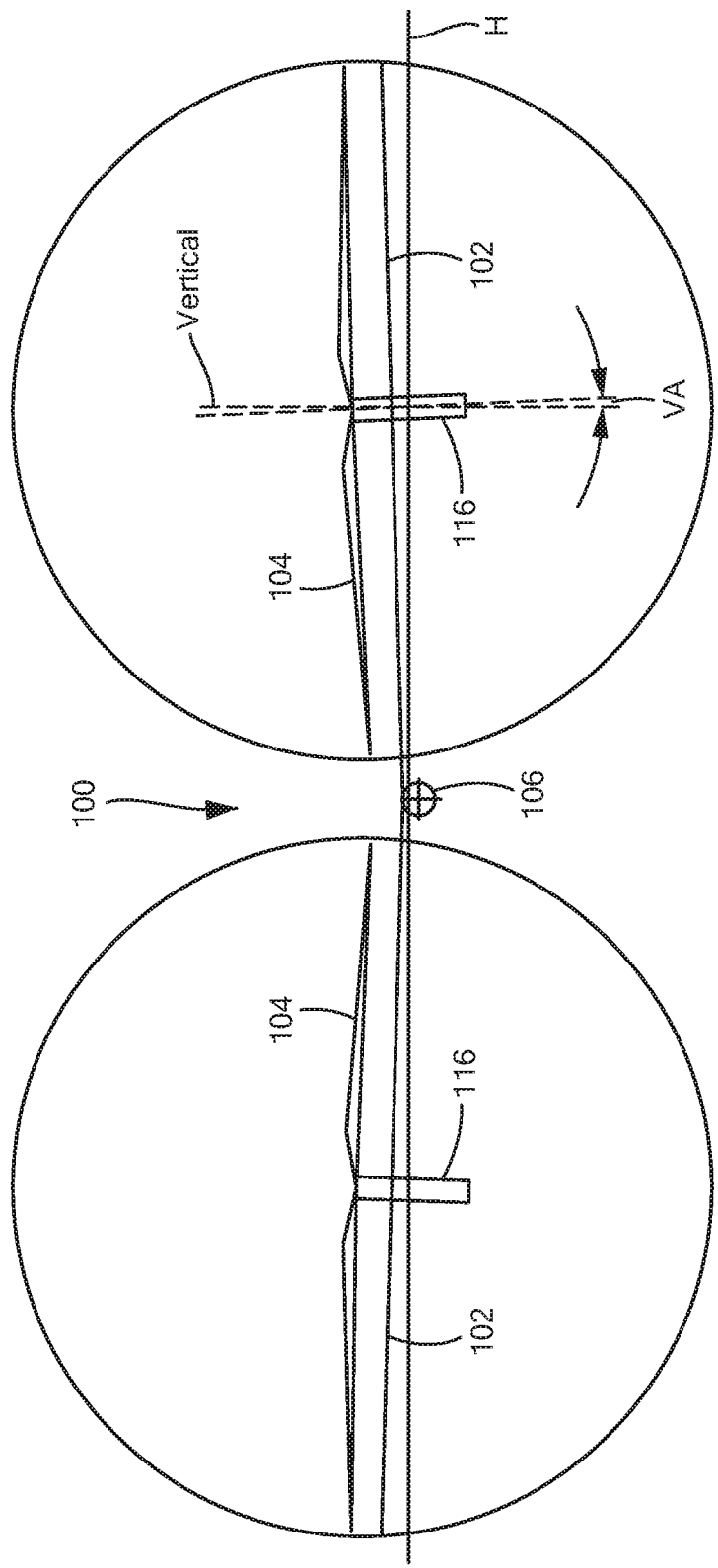
FIG. 1C is a front view of an example flight vehicle in takeoff/landing mode.

In an example embodiment shown in FIG. 1C, the propeller 104/motor 116 is tilted to dihedral. This configuration allows the rotor 104 to be operated with slight vertical angle VA which reduces the lift requirement on the vehicle wing 102, so the wing can now be oriented closer to horizontal H, reducing parasitic drag for a wing oriented with more pitch. This can further improve the lift over drag (L/D) of the vehicle as the drag is reduced, the L/D increases.

In embodiments, the flight vehicle 100 has a power range to optimize the static thrust coefficient, physical rotor scaling factors/stiffness via a wider chord, and physical scaling laws favoring lower power loading. For example, in embodiments total power is limited to up to about 1000 HP and/or total vehicle weight is limited to about 15,000 pounds, which can enhance the physical properties of the rotors 104. In some embodiments, an electric propulsion system is located at the rotors 104 to minimize weight on the wing 102. In one example embodiment, one single power plant provides 600 HP and weighs 520 lbs with gearbox, frame and empennage. In another example embodiment, a signal power plant provides about 400 HP and weighs about 405 lbs, with gearbox, frame and empennage.

Figure 3:
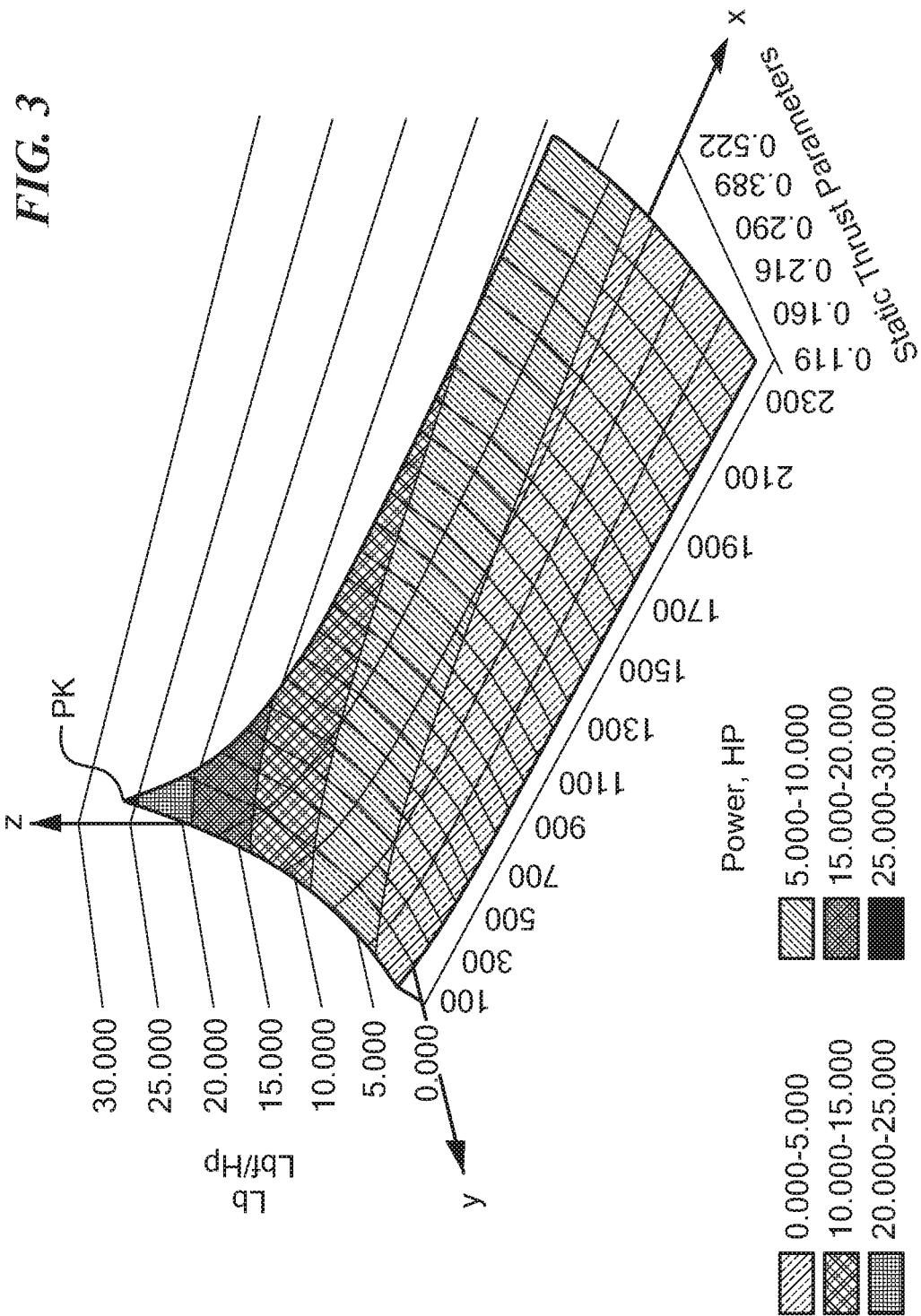
FIG. 3 is a graphical representation of power versus static thrust versus thrust/power.

FIG. 3 shows static thrust of propeller power (x-axis) versus a static thrust parameter (y-axis) versus a ratio of thrust/power (z-axis). As can be seen, the higher ratios of thrust/power are at the lower end of the power values. The ratio dramatically increases as power decreases from about 1000 HP. Thus, it will be appreciated that there is a tradeoff between power and thrust/power ratio.

For example, at sea-level hover, a BELL 427 Helicopter at 1100 HP class develops 5.5 lbf/HP, a BELL 412 helicopter at 650 HP develops 8.5 lbf/Hp, a BELL 407 helicopter at 560 HP develops 8.9 lbf/HP, a ROBINSON R66 Helicopter at 179 HP develops 15 lbf/Hp, ROBINSON R44 helicopter at 163 HP develops 15.4 lbf/HP, a ROBINSON R22 at 87 HP develops 10.7 lbf/Hp, a TREX800 RC Class Helicopter at 1 HP develops 28 lbf/Hp. There are several reasons for this HP to lbf/HP trend. At heavier service class (above 1000 HP), the material distortions via loading of the rotors comes into play, even for heavy service rotor materials, design, and means of fabrication. Also, heavier service class rotors require longer rotors which develop more twist along the rotor length, also distorting the rotor composite pitch angle. At lower duty service class, such as below about 1000 HP, material stiffness properties become more favorable to retain rotor shape. Although general aviation rotors for winged aircraft are on the same order of size as RC class helicopter rotors, general aviation aircraft can only achieve 5-6 lbf/HP, whereas remote control (RC) or sub-scale class rotors of comparable length can achieve 27 lbf/HP. This can be appreciated more fully in FIG. 4 below.

Figure 4:
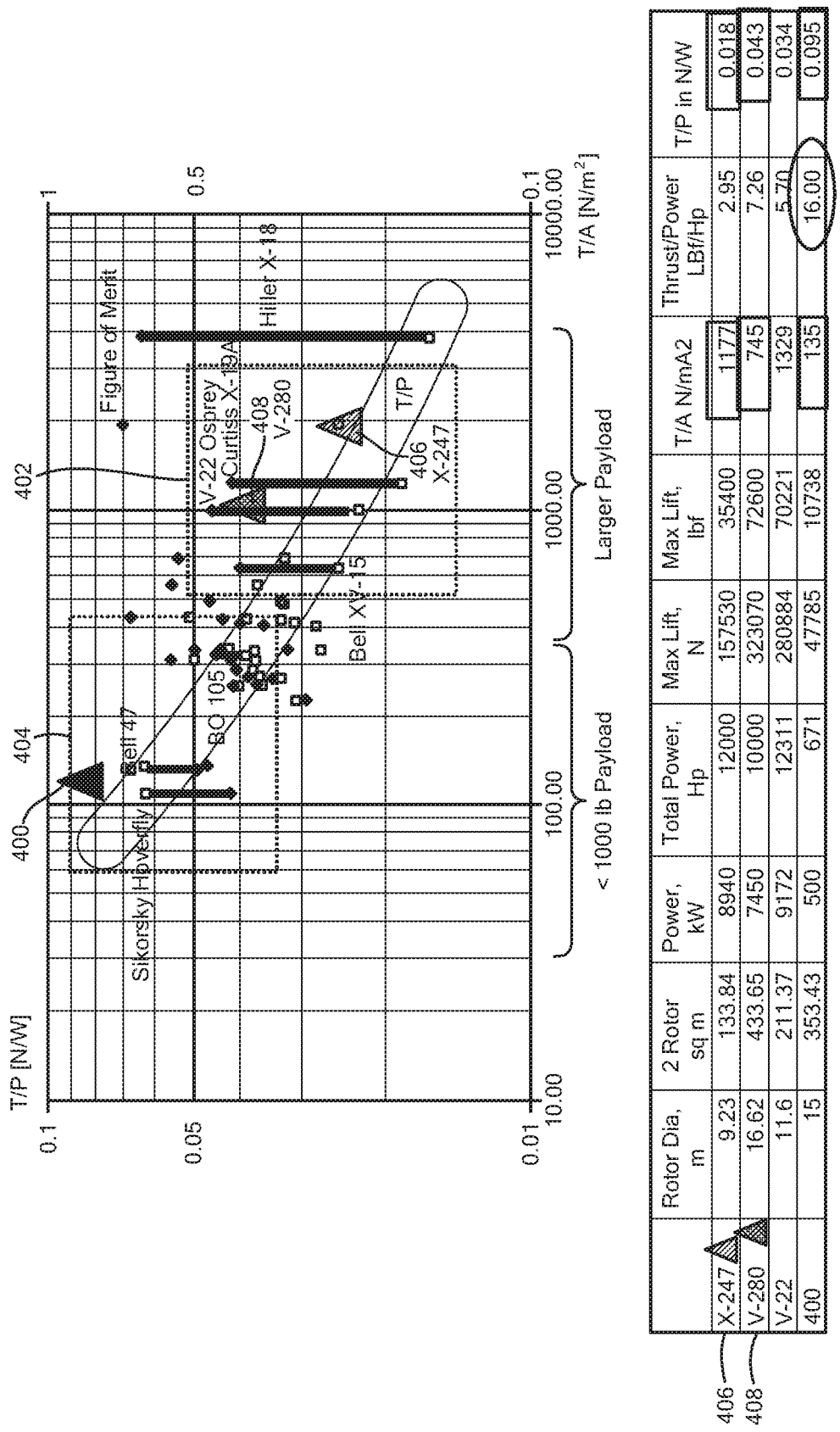
FIG. 4 shows thrust to power ratio and thrust to rotor disk area ratio information.

FIG. 4 shows example log scale information for thrust to power (T/P) in Newton/Watts versus thrust to rotor disk area (T/A) (disk loading) in Newton/$m^2$ for certain known aircraft and an example embodiment 400 of the invention. Aircraft are generally divided between larger payload 402 vehicles, such as the tilt-rotor Osprey, Bell V280, and Bell X247, and <1000 pound payload 404 helicopters, such as Bell 47 and Sikorsky Hoverfly. As can be seen the T/P and T/A characteristics are different depending on the type of payload. More particularly, in general, larger payload 402 vehicles have lower T/P ratios and larger T/A than lower payload 404 vehicles.

Example information is provided in tabular form at the bottom of FIG. 4 for the X-247 406, the V-280 408 and an embodiment 400 of an inventive flight vehicle (in the bottom row of the table). It should be noted that the flight vehicle 400 embodiment has superior T/P (16.0 in LBf/HP and 0.095 in N/W) and a relatively low T/A (135). In particular, it should be noted that the flight vehicle 400 has a listed power of 671 HP, which is significantly lower than the other vehicles 406, 408. It should also be noted that the flight vehicle 400 is intended for service in particular for lower disk loading and disk loading service compared to larger payload vehicles such as 406 and 408, and is intended for service at high-altitudes long flight periods. In other words other words, the flight vehicle 400 is unlike vehicles in the design class of vehicles 406 and 408 which are depicted by the box surrounding vehicles 406 and 408, both of which are incapable of high altitude long endurance operation.

Static thrust refers to the amount of thrust produced by a propeller which is located stationary to the earth. It is understood that static thrust is determined to ensure that the proper propellers and motors have been selected for a particular aircraft and given operating conditions. The first step in calculating static thrust is determining the power transmitted by the motors to the propellers in terms of rpm.

Figure 5:
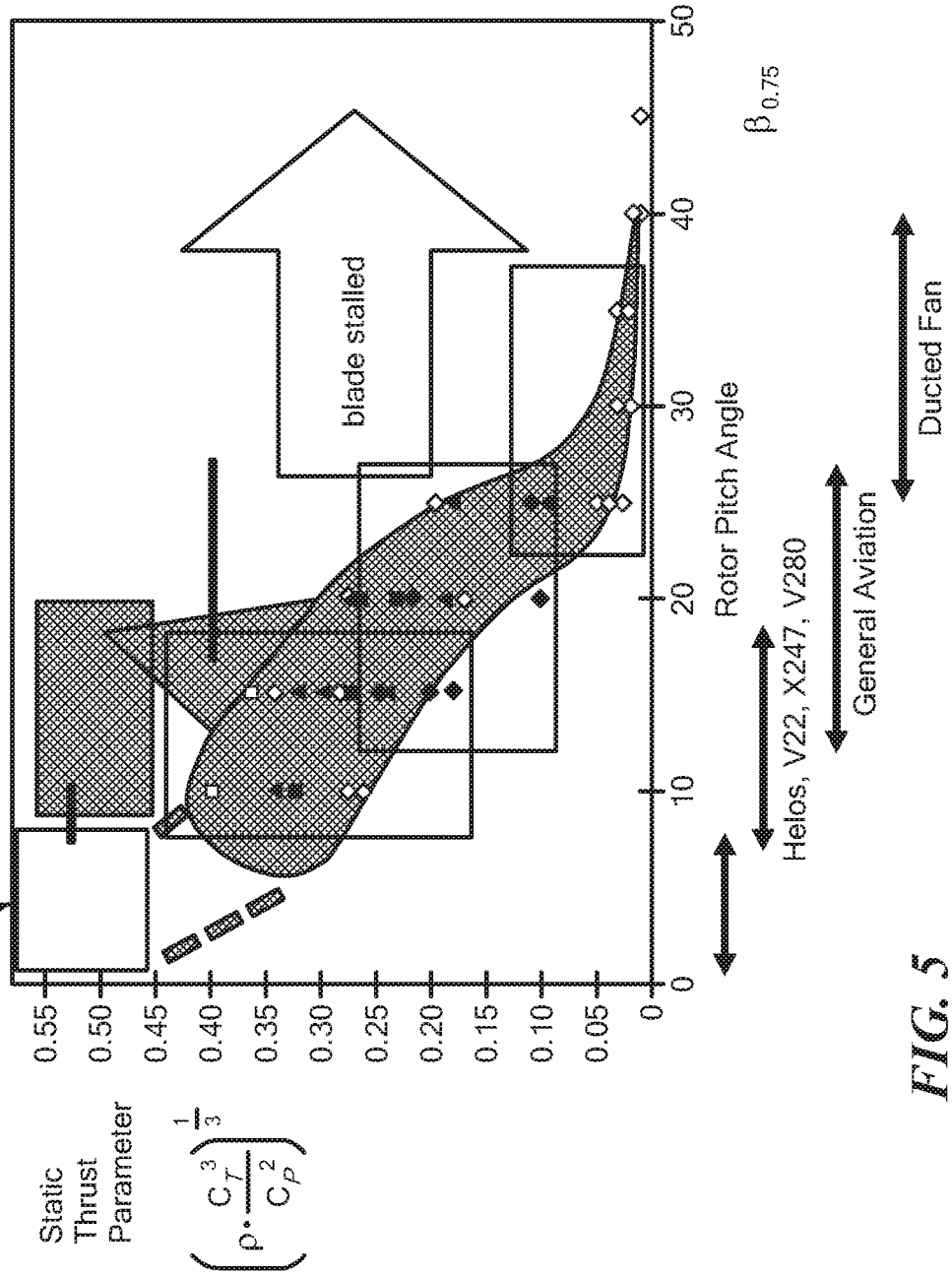
FIG. 5 shows rotor pitch angle versus static thrust information.

FIG. 5 shows example graphical data for a static thrust parameter $$\left(\rho \frac{C_T^3}{C_P^2}\right)^{1/3}$$

versus rotor pitch angle β. Density of air is ρ, static thrust is T, and the thrust coefficient $C_T$ can be computed as set forth below:

$$T = \frac{b}{2}\rho\Omega^2 ca\left[\frac{1}{3}\left(E + \frac{3}{4}FR\right) - \frac{V+v}{2\Omega R}\right]R^3 = \frac{b}{2}\rho ca(\Omega R)^2 R\left[\frac{\theta_{.75}}{3} - \lambda/2\right]$$

$$C_T = \frac{abc}{2\pi R}\left[\frac{\theta_{.75}}{3} - \lambda/2\right] = \frac{a\sigma}{2}\left[\frac{\theta_{.75}}{3} - \lambda/2\right]$$

where $$\sigma = \text{solidity} = BladeArea/DiskArea = bc/\pi R$$

$$\lambda = \text{Inflow Ratio} = \frac{V+v}{\Omega R}$$

where V is the actuator inflow velocity; v is the velocity through actuator disk, F and E are blade pitch angle measures; R is the rotor radius, a is Lift Curve slope (~2π); Ω is rotor rotational speed.

In embodiments, the thrust coefficient $C_T$ is linearly proportional to the pitch angle θ at the 75% radius of the rotor. Pitch angle is commonly defined at the 75% radius.

The power coefficient can be defined as set forth below:

$$C_P = \lambda C_T + \frac{\sigma C_{d0}}{8}$$

The first term $\lambda C_T$ of the power coefficient is identical to momentum theory and referred to as the induced power. The second term refers to the power required to turn the rotor in a viscous flow and is called the profile power. Static thrust T is a function of the static thrust coefficient $$\left(\rho \frac{C_T^3}{C_P^2}\right)^{1/3}$$

and power P that can be put into a rotor or diameter D at some pitch angle theta.

$$T = \left(\rho \frac{C_T^3}{C_P^2}\right)^{\frac{1}{3}}(P \cdot D)^{\frac{2}{3}}$$

Pitch angle theta in FIG. 4, as well as pitch angle beta in FIG. 5, depict the same angle.

Figure 5A:
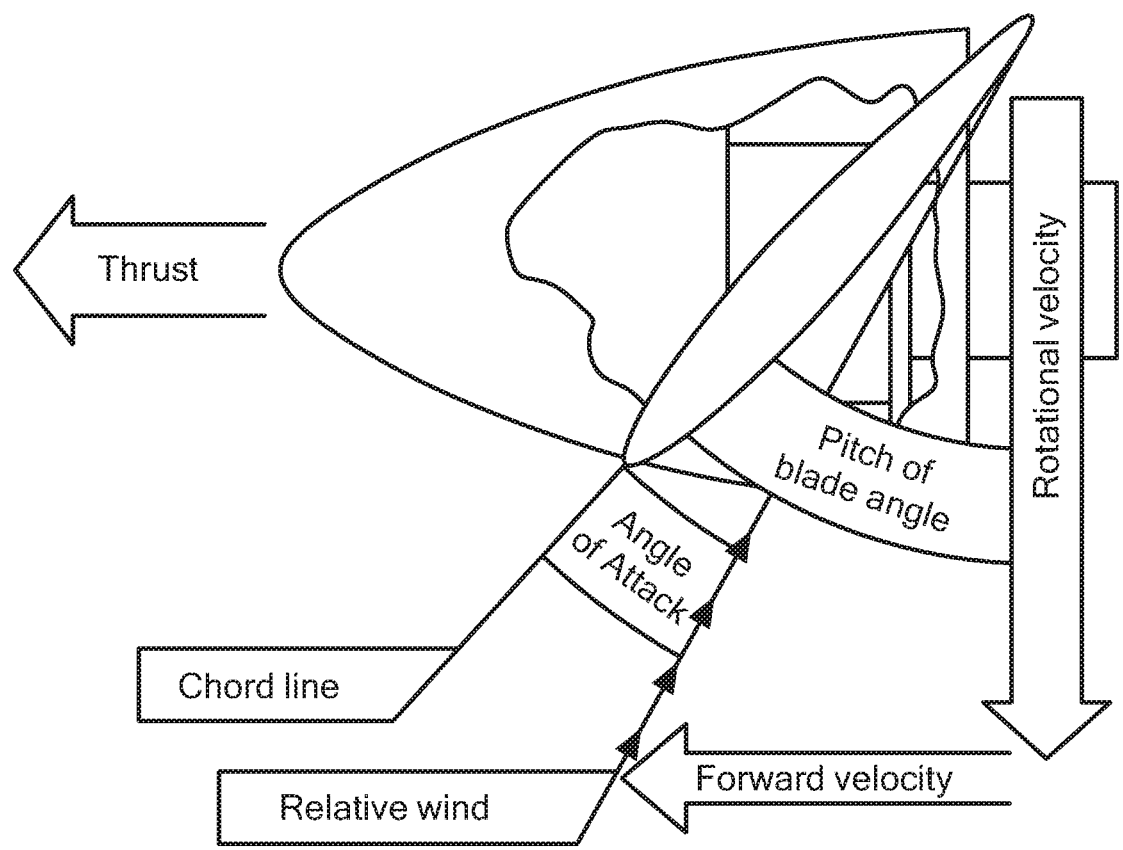
FIG. 5A is a conventional schematic representation of rotor pitch angle.

In FIG. 5, which is derived from work by Flugmodel and Tecknik, it can be seen that there is a continuum of rotor pitch angles versus static thrust parameter. FIG. 5A shows an example representation of rotor pitch angle. For example, as can be seen in FIG. 5, general aviation aircraft generally have a rotor pitch angle ranging from about 10 to 30 degrees and helicopters have a rotor pitch angle ranging from about 8 to 20 degrees. As can be seen, highest static thrust coefficient is expected at low rotor pitch angles. For high static thrust coefficient aircraft, which operate at lower pitch angles, say 10 degrees average rotor pitch, there is greater sensitivity to the relative pitch angle or pitch angle variation which acts along a rotor blade. This is particularly true for a heavily loaded rotor blade typically used in rotorcraft with high thrust, such as in FIG. 4, along the lower right of the trend curves. With heavy blade loading, materials require heavy, stiffer rotor blades as longer blades with more loading are required to prevent torsional distortion and secondary oscillatory effects in flight. Heavy blades require heavier hub structures making them unsuitable for applications in high altitude long endurance flight. Embodiments of the invention have a high thrust coefficient, such as in FIG. 5 upper left at 0.55 or higher, and in FIG. 4 at the upper left.

In another aspect, since the rotor disk loading is in the lower region of FIG. 4 (upper left), and the total power requirement is under 1000 HP, the specific thrust or LBF/HP is maximized, as well for hover. Illustrative embodiments of the invention operate with pitch angles less than 12 degrees, with a static thrust coefficient at or near 1.0, and with high thrust to power ratio, such as 15 LBF/HP, as shown in TABLE 1 below. Unlike the conventional aircraft, embodiments of the invention operate within the low rotor loading and high thrust/power area of FIG. 4, the high static thrust parameter of FIG. 5 (upper left), by using very large rotors that are a sizeable fraction of the wingspan. For example, as shown in TABLE 1 below, an example rotor size is 12 m. TABLE 2 shows other winged vertical takeoff and landing (VTOL) vehicle wing and rotor data. In a dual rotor embodiment, the total rotor span is 24 m with a 33 m wingspan (suited for high altitude long endurance) and a 73% rotor/wing ratio. The V22 has a rotor of 12 m or 24 m total with a wingspan of only 14 m.

TABLE 1

| Model | Hover Power, Watts | Rotor Dia, m | Ct | Cp | Thrust, N | Thrust, Lbf | HP | LBF/HP | Statid Thrust Parameter | T/P, N/W | T/A, N/M^2 |
|---|---|---|---|---|---|---|---|---|---|---|---|
| 209 SeaCobra | 1,072,800 | 13 | 0.0402 | 0.0139 | 44,488 | 9,997 | 1,440 | 6.94 | 0.752 | 0.041 | 315 |
| 406/OH-58D | 484,548 | 11 | 0.0342 | 0.0096 | 24,525 | 5,511 | 650 | 8.47 | 0.820 | 0.051 | 274 |
| 407 | 417,200 | 11 | 0.0284 | 0.0073 | 22,269 | 5,004 | 560 | 8.94 | 0.823 | 0.053 | 249 |
| 412 | 745,600 | 14 | 0.0382 | 0.0075 | 51,601 | 11,596 | 1,001 | 11.59 | 1.079 | 0.069 | 334 |
| AH-1W Sea Cobra | 2,080,000 | 15 | 0.0419 | 0.0175 | 65,727 | 14,770 | 2,792 | 5.29 | 0.674 | 0.032 | 391 |
| 427 | 846,400 | 11 | 0.0311 | 0.0127 | 27,811 | 6,250 | 1,136 | 5.50 | 0.618 | 0.033 | 278 |
| V-22 | 7,344,000 | 12 | 0.1327 | 0.0943 | 134,593 | 30,246 | 9,853 | 3.07 | 0.695 | 0.018 | 1271 |
| 114/CH-47D | 5,646,400 | 18 | 0.0599 | 0.0410 | 120,173 | 27,005 | 7,579 | 3.56 | 0.546 | 0.021 | 457 |

TABLE 1-continued

| Model | Hover Power, Watts | Rotor Dia, m | Ct | Cp | Thrust, N | Thrust, Lbf | HP | LBF/HP | Statid Thrust Parameter | T/P, N/W | T/A, N/M^2 |
|---|---|---|---|---|---|---|---|---|---|---|---|
| R22 | 64,368 | 8 | 0.0118 | 0.0027 | 4,102 | 922 | 86 | 10.67 | 0.655 | 0.064 | 81 |
| R44 | 121,600 | 10 | 0.0173 | 0.0027 | 11,203 | 2,518 | 163 | 15.42 | 0.973 | 0.092 | 150 |
| R66 | 133,600 | 10 | 0.0173 | 0.0026 | 12,027 | 2,703 | 179 | 15.07 | 0.981 | 0.090 | 63 |
| 800 | 529 | 2 | 0.0215 | 0.0038 | 88 | 20 | 1 | 27.95 | 0.960 | 0.167 | 0.46 |
| Embodiment | 372,500 | 12 | 0.0170 | 0.0025 | 33375 | 7500 | 500 | 15.00 | 1.001 | 0.090 | 295 |

TABLE 2

| Vehicle | Rotor Dia, m | Wingspan, m | 2 Rotor sq m | Rotor/Wing Ratio | Power, kW | Total Power, Hp | Max Lift, N | Max Lift, lbf | T/A N/ m^2 | Thrust/ Power LBf/Hp | T/P in N/W |
|---|---|---|---|---|---|---|---|---|---|---|---|
| X-247 | 9.2 | 20 | 134 | 0.46 | 8940 | 12000 | 157530 | 35400 | 1177 | 2.95 | 0.018 |
| V-280 | 16.6 | 11 | 434 | 1.51 | 7450 | 10000 | 323070 | 72600 | 745 | 7.26 | 0.043 |
| V-22 | 11.6 | 14 | 211 | 0.83 | 7344 | 9858 | 280884 | 70221 | 1329 | 7.12 | 0.042 |
| Embodiment | 12.3 | 33 | 238 | 0.37 | 500 | 671 | 47785 | 10738 | 201 | 16.00 | 0.095 |

In embodiments, a ratio of a single rotor diameter to wing length ratio is equal to or greater than about 0.25. One embodiment includes a two rotor system, on each half of the wing. In one particular embodiment, a maximum ratio is greater than 0.5, with each of two rotors extending beyond the wing. For a ratio of 0.25, to lift the same weight, for example, the weight shown in Table 2, the thrust/power drops to the levels intended for high lift service (higher thrust/area), as in FIG. 4.

In some embodiments, the single rotor diameter to wing length ratio is 0.5, as it is more practical for the rotors to not extend beyond the length of a long wing vehicle (glider). This feature of trading rotor length for thrust/area and thrust/power is captured in FIG. 4, which shows high lift high power systems, which are winged, and lower power medium to light lift systems, which are not winged (except for embodiments of the invention).

A summary of some vehicles with large rotor to wing length ratio are shown in Table 3. This is the single rotor diameter compared to the vehicle wingspan.

TABLE 3

| Vehicle | Wingspan, ft | Rotor Diameter, ft | Rotor Dia to Wingspan Ratio |
|---|---|---|---|
| Grob Egrett G520 | 103.3 | 9.3 | 0.09 |
| Grob Strato 2C | 185.4 | 19.7 | 0.11 |
| Tupolev TU-95 | 164.4 | 19 | 0.12 |
| Vought V-173 | 32.5 | 16 | 0.5 |
| Osprey V-22 | 45.8 | 38 | 0.84 |
| Embodiment | 100.0 | 37 | 0.37 |

The X-247, V-280 and V-22 are not high-altitude long endurance vehicles. From Table 2 above, the T/A and T/P places these vehicles in the mid to lower right of FIG. 4. In contrast, embodiments of the invention utilize a unique limitation on power (e.g., about 1000 HP) for each rotor because of previously discussed material limitations causing a rotor to twist, requiring much heavier rotors, thus being unsuitable for high altitude long endurance. In addition, example embodiments of the invention also utilize a combination of T/P and T/A properties that further distinguish over conventional aircraft, such as high static thrust coefficient (1.0), large wings (33 m), a high rotor to wingspan ratio (0.9) rotors that are employed vertically for vertical takeoff and landing, rotors that convert from vertical to horizontal for forward flight, operation at high altitude, and/or long endurance capability (24 hours). In addition, the choice of these properties allows a static specific thrust >10.0 lbf/hp.

In embodiments, the flight vehicle combines optimized propulsion efficiency with a low-drag, high-altitude wing. In embodiments, the flight vehicle is naturally stable with a center of effort (CE) which is a point at the center of the rotor circle where the rotor forces act in front of a center of gravity (CG) for flight, CE above CG for hover, and symmetric CE to eliminate torque effects (roll).

Figure 6:
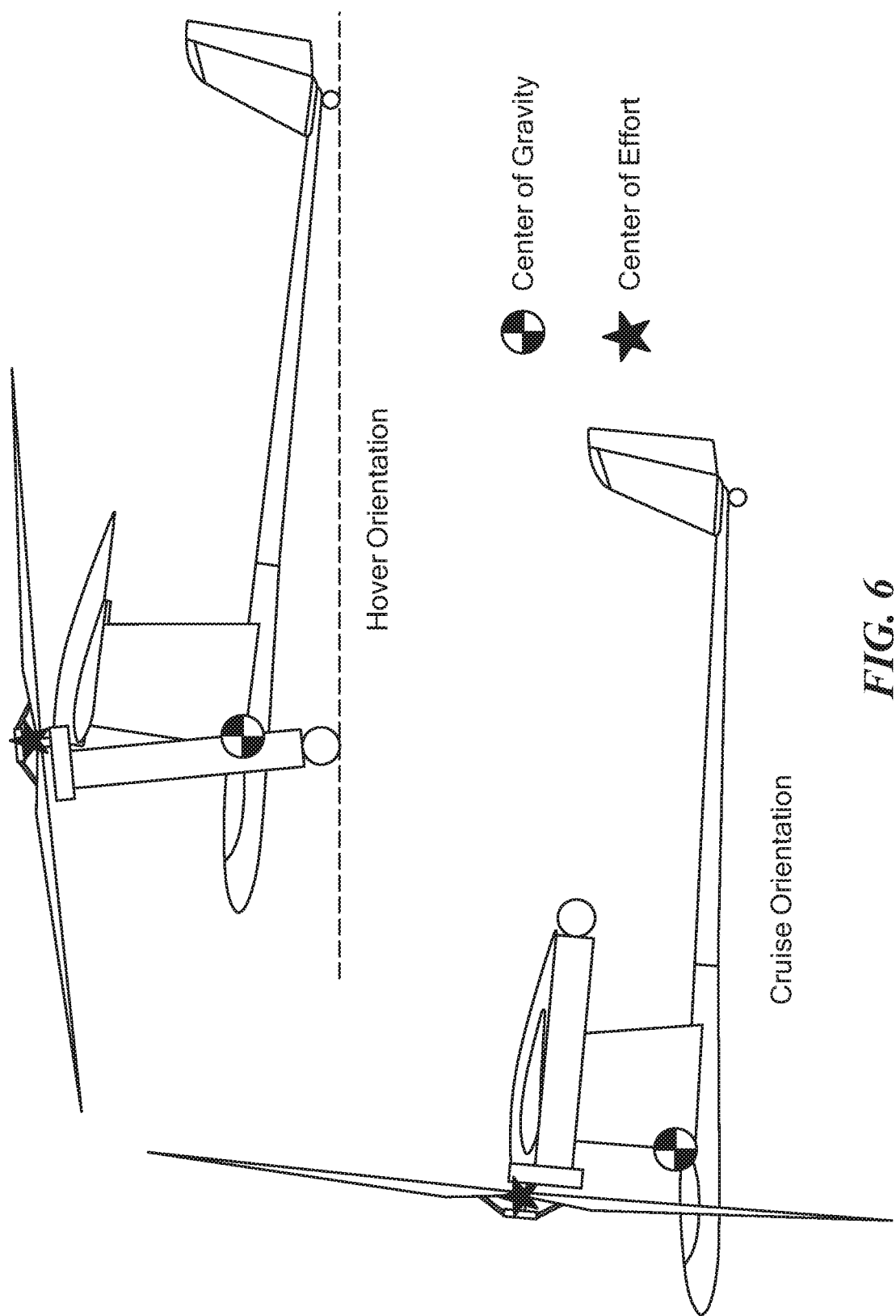
FIG. 6 shows side views of an example flight vehicle in cruise mode and takeoff/landing mode (hover)

FIG. 6 shows hover and cruise orientation for an example embodiment, with a CE that is centered on the rotor shaft at the rotor plane, which sits above the Cg, but generally vertically aligned. In both hover and cruise, the CE is above the Cg. For hover, or takeoff and landing, this increases the stability of the vehicle. For cruise, the vertical separation may induce pitch moment to the vehicle but can be easily offset by various trims, including the rotor orientation angle, and other trims.

In one embodiment, an underslung pod and forward hinge point is located with respect to the center of gravity, so that when the rotor is rotated horizontal for takeoff or landing, the overall Cg lowers even further because the rotor/motor/nacelle is rotated from a horizontal position to a vertical position at the forward hinge-point, unlike for example the V280, X-247 and V-22, which rotates a large turbine engine/rotor assembly through a center hinge-point, keeping the overall Cg high with an already high Cg due to the rotor having the power generation means on wing. In contrast to example embodiments of the invention having an electric motor alone, with gearbox, and power production means within the airframe, the Cg is much lower than that of the these conventional VTOL vehicles.

It is understood that the center of gravity (CG) of an aircraft is the point over which the aircraft would balance. The center of gravity affects the stability of the aircraft. To ensure the aircraft is safe and efficient, the center of gravity should fall within specified limits. For example, removable or permanent ballast should be considered in determining the center of gravity into the allowable range in longitudinal and lateral limits.

In embodiments, a relatively low CG is provided with propulsion and fuel relatively low in the flight vehicle and the rotors 104 on the wing 102. Alignment of the CE above the Cg for cruise and hover increases the stability envelope of the vehicle, and there is larger separation of the Ce from the Cg which acts as a correcting moment on the airframe.

In embodiments, the wing 102 is a glider-type wing with a high aspect ratio for maximizing lift versus drag and large rotors 104 for maximizing flight efficiency (static and cruise). The aspect ratio is the wingspan to chord length ratio. In example embodiments, the aspect ratio ranges from 10:1 to 30:1. Conventional VTOL (V22, X247, V280, TR36XP for example) rely on lower aspect wings more suited for heavier transport operation at altitudes below 35 kft, or in some examples break the wing up into sections that would affect the flow attachment at the empennage transitions.

Some embodiments of the invention use an underslung engine pod with forward hinge (see FIGS. 1A, 1B), and use a solid wing with no breaks in surfaces that would affect flow attachment. A high aspect ratio continuous wing is more suited to HALE operation, with an operational ceiling above 35 kft up to 51 kft altitude. In example embodiments, with a 33 m wingspan, a 20:1 aspect ratio would have a chord of 1.6 m and a 30:1 aspect ratio wing would have a chord of 1.1 m. The high aspect ratio wing of 20:1 would also have less obstructed flow on vertical rotor orientation (takeoff and landing) than a 10:1 aspect ratio wing, and a 30:1 aspect ratio wing would present even less obstruction than a 20:1 aspect ratio wing. As used herein a high aspect ratio wing has a ratio greater than 10:1.

In embodiments, as described more fully below, flap configurations can increase the aspect ratio on takeoff and landing. Flaps can also assist in the vertical takeoff and landing control, having large moment capability at distances from the vehicle center-point to wing flap close to the wing ends. Servo control of the flaps would provide the bandwidth necessary for good control characteristics, of say 10 Hz bandwidth.

Figure 7:
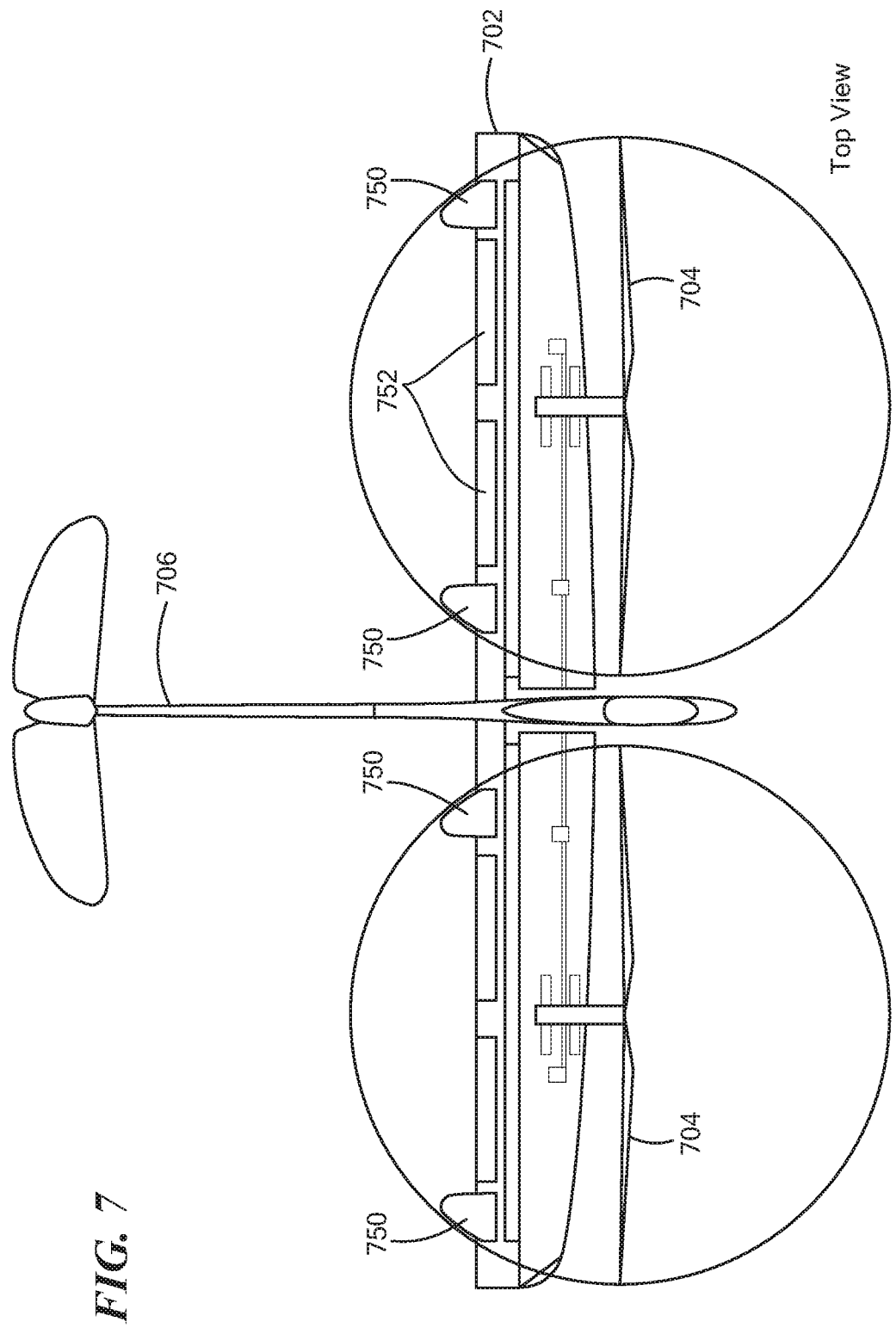
FIG. 7 is a top view of an example flight vehicle with control surfaces for cruise mode and takeoff/landing mode.
Figure 8:
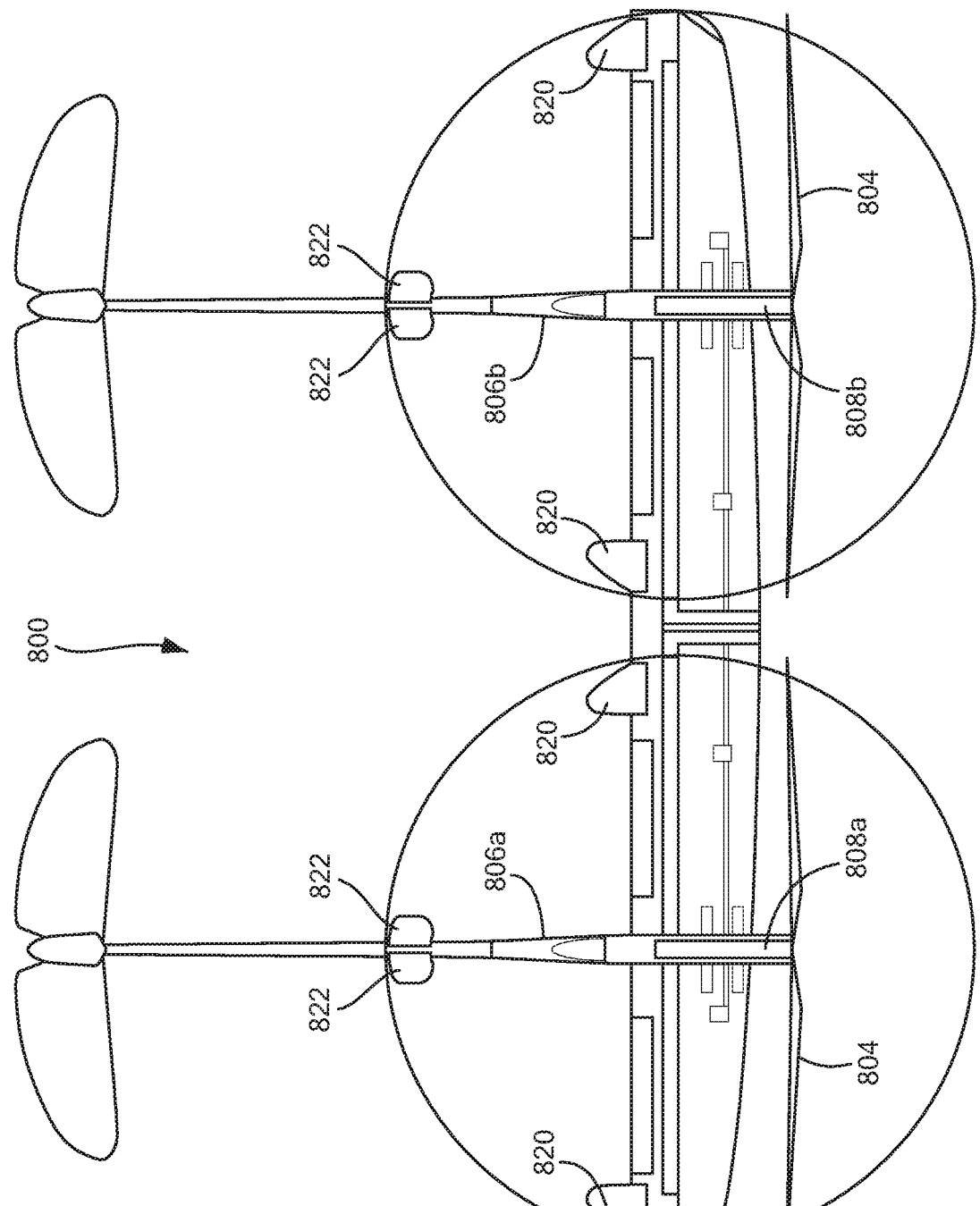
FIGS. 8-11 show a dual fuselage flight vehicle.
Figure 9:
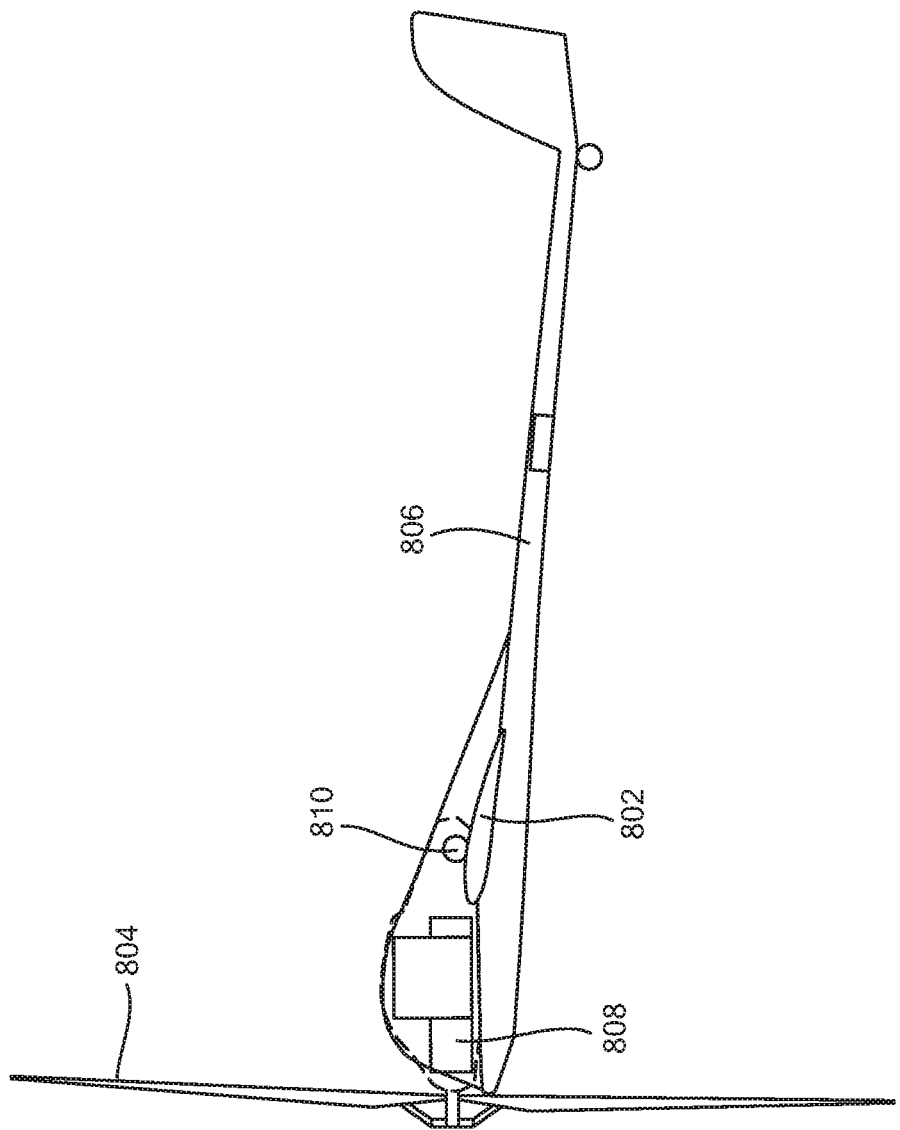
Figure 10:
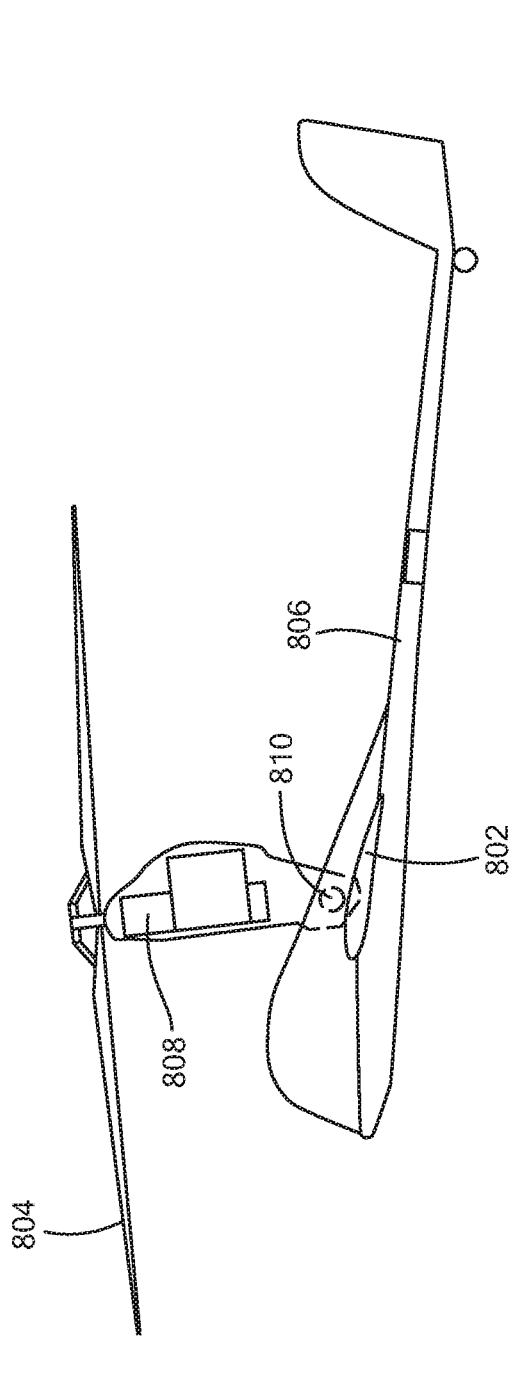
Figure 11:
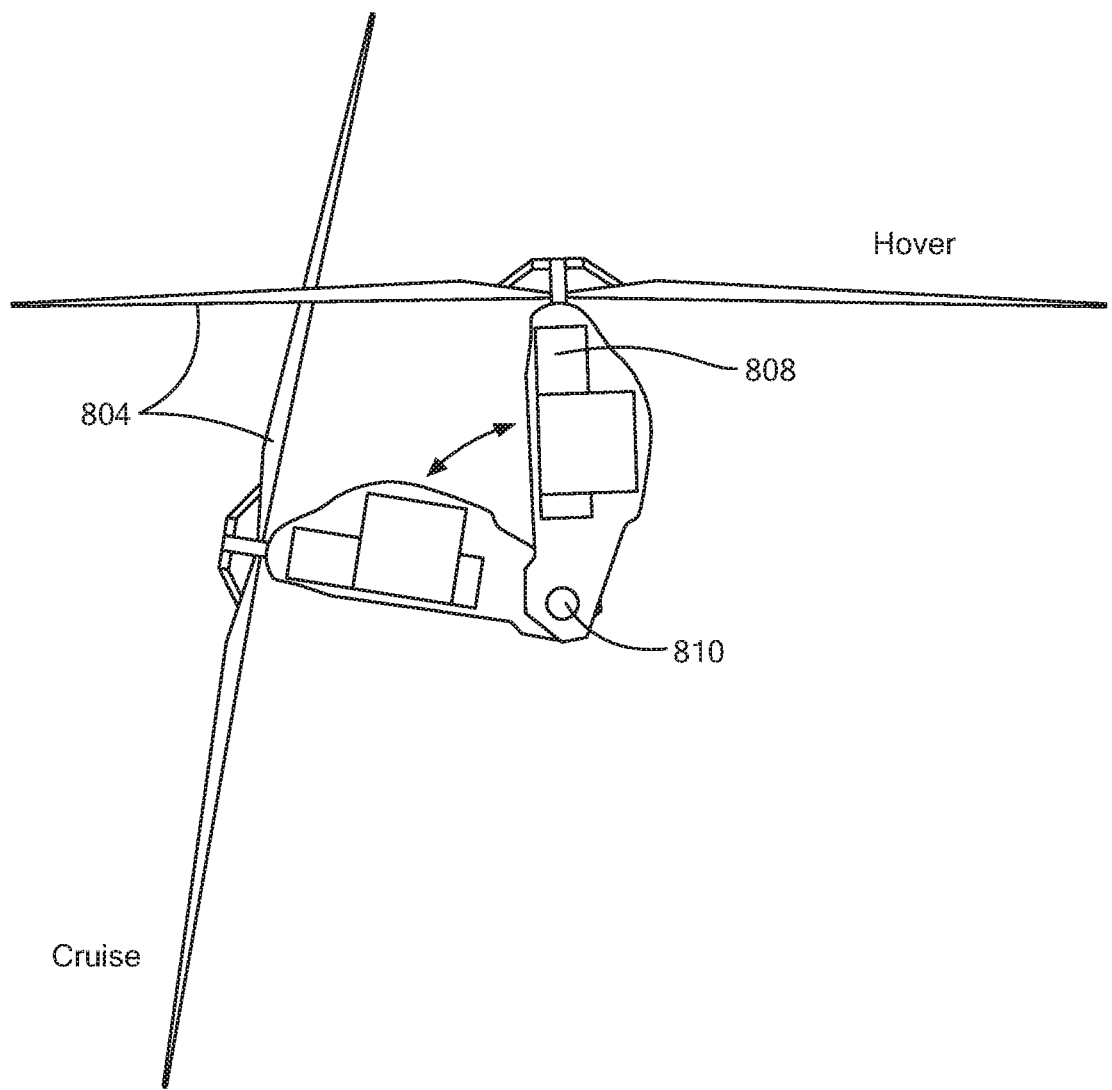

FIG. 7 attitude control via control surfaces and differential rotor collective pitch for hover in illustrative embodiments. A wing 702 supports rotors 704 and a fuselage 706 supports the wing 702, as described above. A series of flaps 750 provide hover pitch fine control and cruise ailerons 752 provide control in cruise mode.

The hover control trim is supplied by the dual purpose servo controlled ailerons 750,752. The hover trim control is accomplished toward the end of rotor using an aileron control surface 750 that is extended downward in hover and may be larger than the rest of the aileron in chord. This aileron 750 is on both outboard wing areas at roughly 80% of the rotor radius extending to 100% of the rotor radius on both left and right wing. This can control the roll of the vehicle, and differential rotor collective pitch can control the coarse roll as well as the vehicle yaw. Vehicle Pitch in hover is controlled coarsely by the propulsion pod pitch angle and finely by four sets of dedicated aileron 752 of longer chord at both 80% of rotor and 20% of rotor on either wing.

As for the rotor aspect ratio, the rotor service at takeoff and landing requires a minimum of 10 lbf/hp, sea level hover. From data in Table 1 above, in 100-300 HP range a specific thrust of 15 lbf/hp is achievable, and with less stringent requirements on rotor operation in cruise or climb in horizontal flight. Rotors that are then oriented with rotation axis horizontal and rotor plane vertical do not require as stringent a design as that needed in rotorcraft continuously operated with the rotor plane near horizontal and rotation axis vertical during cruise, as for helicopters for example, except during transition to horizontal flight. The rotor would also have a high aspect ratio, from 30:1 to 60:1, for example a 10 m length and 0.25 m chord. With rotor aspect ratio in this range, desired stiffness properties can be achieved in addition to the lift and drag coefficients. With fine pitch control, a high aspect ratio rotor is more suitable since the wider chord and lower aspect ratio increase the pitch angle sensitivity (relative to the rotor velocity vector). In embodiments, the rotor is also designed for operation below a limit of 1000 HP per propulsive motor. Typically for conventional aircraft, as in helicopters, lift is provided by the rotor, to suspend the aircraft in hover or horizontal cruise.

In example embodiments of the invention, the wings provide cruise lift and the rotor plane is normal to the inflow, but takeoff requires a rotor that is designed for near 100% of the lift duty. Some amount of lift is provided by the wings on vertical takeoff, which may unburden to some extent the overall rotor design. The rotor listed in TABLE 1 is 12 meters but is sized somewhat less in length than a rotor used for a helicopter with an equivalent power rating. For example, for the ROBINSON R44 of power 500 HP with a rotor of length 14 m, a smaller rotor of 12 m may be used which reduces the stiffness and weight burden. A smaller rotor may be used because the total duty of lift is mainly in the VTOL operation, which may be only 1-5% of the total duty, spending far more time in cruise where wings provide most of the lift.

Example embodiment vehicle component weights are shown in Table 2 above, contrasted to the Grob 520G with similar 33 m wingspan, also weighing 10,000 lb, operational ceiling to 50,000 ft and 8 hour endurance. In example embodiments, useful payload capacity to 1320 lb is sufficient for integration of an aerial communications node payload, for example the payload for the EQ-4B (Battlefield Airborne Communications Node, BACN) is less than 1320 lb with antennas and cables. The EQ-4B platform is unmanned, but the Grob 520G and BACN E-11A are manned platforms.

For aircraft embodiments configured for lower orbit size, with cruise speeds of 175 mph, it is suited for aerial communications relay, intelligence, surveillance and reconnaissance service. At 175 mph at 50,000 ft altitude, orbits as small as 5 nmi diameter are possible, whereas the EQ-4B small orbit is 40 nm and the E-11A is 50 nmi, which reduces the elevation angle of these BACN aircraft to an average of less than 10% duty cycle over the battlefield. Embodiments of the invention may also be suited for experimental class aircraft recreation flight service.

Table 4 below shows example components and weight for an illustrative aircraft embodiment.

TABLE 4

| 33 m Wingspan | Weights, Lb |
| --- | --- |
| Wing, Weight | 2150 |
| Controls, servos | 650 |
| Fuselage, tail | 2250 |
| Rotor/Motor, 500HP | 1270 |
| APU/GEN | 1200 |
| Fuel | 830 |
| Payload | 1320 |
| Batteries | 600 |
| Total Weight | 10270 |

The wing may have control surfaces for hover trim. The overall controls include individual rotor blade pitch control via collective pitch. This is accomplished via servos which can deliver 10 Hz bandwidth. This provides total lift and roll control, with differential between left and right motor thrusters. For yaw control and vehicle pitch control in hover, wing flaps are used. Because of the control and Cg placements for hover, for cruise the rotor plane is transitioned from horizontal to vertical. In transition and cruise, the tail surfaces and flap controls are blended to operation from hover to cruise.

In embodiments, a hybrid electric propulsion system uses brushless DC motors. In example embodiments, a through-shaft pitch control tends to extend the propulsion system length. A gearbox on the front of the motor provides a RPM range of the motor, which is 400-800 RPM, for example, for 33 m wing class, 500 HP per motor. For an electric roadcar motor, at 90 mph the wheel speed is 1500 RPM using a 19" wheel. With a long propulsion system, positioned near V-strut airframe stiffeners, the propulsion pod serves also as wheel landing opposite the rotor end, shown in FIG. 1B. This serves the dual purpose of containing the landing gear and acting to extend the gear some distance to the ground from the wing, which is an above fuselage wing. Placement of a propulsion pod at the V-strut enhances airframe rigidity to reduce airframe vibration modes.

FIGS. 8-11 show a flight vehicle 800 having a long glider-type wing 802 and a high rotor 804 diameter-to-wingspan ratio with a dual fuselage 806a,b configuration. In embodiments, motor pods 808a,b are located within a top portion of each fuselage 806a,b. Separate power sources can be provided for each of the drives either in the motor pod 808 or a bottom portion of the fuselage. There may be one or more APUs to power a DC drive or a turbine directly driving the motor pods 808, which may sit in the motor pod itself.

In embodiments, the motor pod 808 is hinged 810 toward the trailing edge portion of the wing 802 to the fuselage 806. An articulating drive, such as hydraulic or servo, can rotate the motor pod 808 from hover (FIG. 10) to cruise orientation (FIG. 9) or from cruise to hover. The rear hinge favors the elevation of the rotor well above the vehicle center of gravity, which is near the hingepoint 810 of the motor pod.

The fuselages 806a,b are fixed to the wing 802, but the top section containing the motor pod 808 is able to rotate 90 degrees or more. Cruise ailerons 818 can be used primarily during cruise mode. There may be full helicopter controls on each of the motor pods 808, controlling collective pitch, and cyclic pitch. In one embodiment, only collective pitch is controlled and vehicle pitch, roll and yaw are controlled by differential rotor collective pitch with trim ailerons 820 and fuselage ailerons 822. The collective pitch in this embodiment controls the blade angle of attack. The blade control mechanism can be simplified using the wing trim hover ailerons 820 which can control pitch and roll. The fuselage ailerons 822 can also control more coarse pitch. Collective differential pitch can control the vehicle roll and/or yaw. An advantage of servo control is the bandwidth of the servos, which can achieve 10 Hz, for improving the vehicle stability envelope. The servos and placement of the ailerons at the far reach of the blades also increases the lever arm of the various body torques such as the wing aileron, which has a lever arm of 1 blade radius, for example, and fine torque arm acting on the trailing edge of the wing. The fuselage ailerons have a moment of one half of the blade radius, for example, and a body torque arm of greater reach than the wing aileron hover flaps, so the longer reach is useful for the coarse pitch control.

Embodiments of the invention are different than known aircraft, such as the V-247 and the tilt-wing TR36XP. The V-247 is a VTOL which is designed for heavy lift operations, with distinguishing Thrust/Area and Thrust/Power shown in TABLE 2 above. Embodiments of the invention have individual rotor power below about 1000 HP, which influences the achievable rotor stiffness capability and ultimately the ability to act as a VTOL on takeoff and operate at high altitude. The TR36XP uses a tilt-wing, while embodiments of the invention include a tilted underslung pod and a thruster pod with a landing gear. Also, the TR36XP power is in the 2500 HP range and uses two engines for heavy lift operations.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A high altitude long endurance (HALE) flight vehicle, comprising:
   a wing having a high aspect ratio;
   first and second rotors connected to the wing, wherein the first and second rotors have a high aspect ratio, wherein a ratio of the rotor diameter to wing length is equal to or greater than about 0.25;
   a first motor to drive the first rotor and a second motor to drive the second rotor, the first and second motors having less than about one thousand horse power;
   wherein the HALE flight vehicle has a cruise mode in which the first and second rotors are substantially vertical and a takeoff/landing mode in which the first and second rotors are substantially horizontal.

2. The flight vehicle according to claim 1, wherein the first rotor has a thrust coefficient of at least 0.55.

3. The flight vehicle according to claim 1, wherein the first rotor has a pitch angle of less than about twelve degrees.

4. The flight vehicle according to claim 1, wherein the first rotor has a static thrust coefficient of about 1.0.

5. The flight vehicle according to claim 1, wherein the first rotor has a thrust to power ratio of at least 15 LBF/HP.

6. The flight vehicle according to claim 1, wherein the first motor is less than 1000 HP.

7. The flight vehicle according to claim 1, wherein the vehicle has a rotor to wingspan ratio of at least about 0.9.

8. The flight vehicle according to claim 1, wherein the wing aspect ratio ranges from about 10:1 to about 30:1.

9. The flight vehicle according to claim 1, wherein the HALE vehicle is configured for unmanned operation.

10. The flight vehicle according to claim 1, wherein the first motor comprises an electric motor.

11. The flight vehicle according to claim 1, wherein the wing is connected to a fuselage by at least two V-struts.

12. A method for providing a high altitude long endurance (HALE) flight vehicle, comprising:
    connecting first and second rotors to a high aspect ratio wing, wherein the first and second rotors have a high aspect ratio, wherein a ratio of the rotor diameter to wing length is equal to or greater than about 0.25;

employing a first motor to drive the first rotor and a second motor to drive the second rotor, the first and second motors having less than about one thousand horse power;

wherein the HALE flight vehicle has a cruise mode in which the first and second rotors are substantially vertical and a takeoff/landing mode in which the first and second rotors are substantially horizontal.

13. The method according to claim 12, wherein the first rotor has a thrust coefficient of at least 0.55.

14. The method according to claim 12, wherein the first rotor has a pitch angle of less than about twelve degrees.

15. The method according to claim 2, wherein the first rotor has a static thrust coefficient of about 1.0.

16. The method according to claim 12, wherein the first rotor has a thrust to power ratio of at least 15 LBF/HP.

17. The method according to claim 12, wherein the first motor is less than 1000 HP.

18. The method according to claim 12, wherein the HALE vehicle is configured for unmanned operation.

19. A high altitude long endurance (HALE) flight vehicle, comprising:

a wing means having a high aspect ratio;

first and second rotor means connected to the wing means, wherein the first and second rotor means have a high aspect ratio, wherein a ratio of a rotor diameter to wing length is equal to or greater than about 0.25; and a first motor to drive the first rotor means and a second motor to drive the second rotor means, the first and second motors having less than about one thousand horse power;

wherein the HALE flight vehicle has a cruise mode in which the first and second rotors are substantially vertical and a takeoff/landing mode in which the first and second rotors are substantially horizontal.

20. The flight vehicle according to claim 19, wherein the first motor is less than 1000 HP.

* * * * *